United States Patent [19]
Starkey

[11] Patent Number: 5,571,539
[45] Date of Patent: Nov. 5, 1996

[54] MOLD WITH AN ON-BOARD COUNTER OR MONITOR

[75] Inventor: Glenn Starkey, Lake Zurich, Ill.

[73] Assignee: D & L Incorporated, Wauconda, Ill.

[21] Appl. No.: 367,396

[22] Filed: Dec. 30, 1994

[51] Int. Cl.[6] .................................................. B29C 33/00
[52] U.S. Cl. ........................... 425/135; 249/103; 249/104; 425/190
[58] Field of Search .................................... 249/103, 104; 425/190, 192 R, 135

[56] References Cited

U.S. PATENT DOCUMENTS

| | | | |
|---|---|---|---|
| 4,890,306 | 12/1989 | Noda | 377/15 |
| 4,964,144 | 10/1990 | Uchida et al. | 377/15 |
| 5,057,000 | 10/1991 | Mangone, Jr. | 249/103 |
| 5,344,301 | 9/1994 | Kamiguchi et al. | 425/169 |

FOREIGN PATENT DOCUMENTS 5-116129  5/1993  Japan .

OTHER PUBLICATIONS

MACO 8000 VA–Plastics Manufacturing Control System pp. 1–11, May 1991.

*Primary Examiner*—Tim Heitbrink
*Attorney, Agent, or Firm*—Fitch, Even, Tabin & Flannery

[57] ABSTRACT

An injection plastic mold is provided with its own on-board monitor or counter, which is actuated with each opening and closing cycle of the mold to maintain a count of the operating cycles performed. This count is maintained with the mold, whether the mold is on the press or a storage rack. The counter or monitor is relatively inexpensive and unobtrusive and is capable of withstanding harsh temperatures and shock that are encountered in an injection molding environment. The counter or stroke monitor may be either a mechanical counter or an electrical counter which is incorporated into a mold half to remain with the mold when it is stored away from a molding machine, when operated during an initial set-up operation, and when operated during a production run. Whether an on-board mechanical counter or an on-board electrical counter, the counter is hermetically sealed against the intrusion of damaging liquids or chemicals and is mounted in a protective housing to protect against shock, etc. An actuating mechanism is associated with the counter with the counter and its actuating mechanism secured to one of the mold halves so that the actuating mechanism causes the counter to advance and register a count with each molding cycle.

14 Claims, 3 Drawing Sheets

MOLD WITH AN ON-BOARD COUNTER OR MONITOR

FIELD OF THE INVENTION

This invention relates to a mold for use in a plastic injection molding press wherein the mold is used to manufacture plastic parts.

BACKGROUND OF THE INVENTION

In the past, injection molds were often left in the press and were run for very long part runs; and the mold was seldom removed from the press for storage. Today however, many manufacturers of plastic parts utilize "just-in-time" practices wherein the purchaser does not want an inventory of large quantities of plastic parts, but wants the parts to be made in smaller batches and to be delivered on an "as-needed" basis. In these past systems, the molds were continuously associated with the press so that counters on the press itself could be relied upon to provide the number of cycles of the mold and this was used to provide information relative to preventative maintenance, such as cleaning of the mold or lubricating critical surfaces. Where a number of molds are taken in and out of the press for just-in-time manufacturing to produce different parts on an as-needed basis, the press counters which count the number of cycles, can no longer be relied upon for maintenance schedules because a series of different molds is used in the press for relatively short periods of time. Currently, some records are kept as to when and how long a particular mold has been run, usually such records are kept in a computer log or in a paper maintenance record. Such computer logs or paper records may be used to schedule preventive maintenance of the mold. Sometimes such computer or paper records may not be an accurate or positive means of assuring that the proper maintenance is being scheduled for each of the various molds being used with the same or different molding presses. Obviously, without the proper maintenance of an injection mold, damage may occur and down time may also be the result.

Preventive maintenance of a mold is a much more critical issue today, particularly for just-in-time manufacturing parts on an as-needed basis. That is, with the advent of new, engineered thermoplastic materials, the molds are often run faster, hotter and must be kept cleaner than they had to be in the past. Therefore, the adequate maintenance for each mold is a much more critical issue today than in the past.

SUMMARY OF THE INVENTION

In accordance with the present invention, an injection plastic mold is provided with its own electrical monitor or counter and battery, which is actuated with each opening and closing cycle of the mold to maintain a count of the operating cycles performed. This count is maintained with the mold, whether the mold is on the press or a storage rack. The counter or monitor must be relatively inexpensive and unobtrusive and capable of withstanding harsh temperatures and shock that are encountered in an injection molding environment.

By incorporating electrical batteries into the counter, the cycle and other information is retain when the mold is removed from the press and stored on a storage shelf. The preferred electrical monitor includes an actuator which is engagable by another part of the press upon opening and closing the press to provide a count of the number of cycles of the press. Preferably, the electrical monitor also includes a clock to time a molding cycle and a means to provide an average production cycle time for the molder.

It is preferred that the particular electrical monitor also have the capability of having a date or calendar means so that the date of usage of the mold is also stored in memory. Thus, the mold monitor may be interrogated to provide the dates on which the mold was in production and the production cycles for this usage period so that the history may be readily known particularly, when the mold is replaced in the press in just-in-time manufacturing to produce parts on an as-needed basis.

The monitor also may have a settable counter switch that is set to a predetermined count at which maintenance should be done. When the mold has been cycled through to the previously set count, an alarm or indicator is operated to alert the operator that it is time to perform mold maintenance.

In accordance with another aspect of the invention, the preferred monitor also is programmable to the extent that the mold serial number and/or part name, part number or other identifying factors with respect to a particular part may be acquired from the monitor. With the date and time information, as well as the specific parts being run, there may be provided a history with respect to the number of specific parts made and the date of their manufacture, as well as their average cycle time or other information so as to provide a better history with respect to when maintenance should be made and what type of maintenance should be used.

It is preferred that the mold monitor also have ports so that a readout device may be connected to the ports of the electrical monitor so that the history and average cycle time and/or total cycles as well as any stored maintenance information may be read out from the electrical counter.

Thus, the present invention provides a mold monitor which is attached to a mold and serves as a memory device for the injection mold, which creates accurate data with respect to its usage and allows for timely and proper maintenance. Preferred memory devices also are programmable for specific part identity and have readout devices which provide significant information with respect to the production usage and dates of usage of the mold.

DETAILED DESCRIPTION OF THE PREFERRED EMBODIMENT

Figure 1:
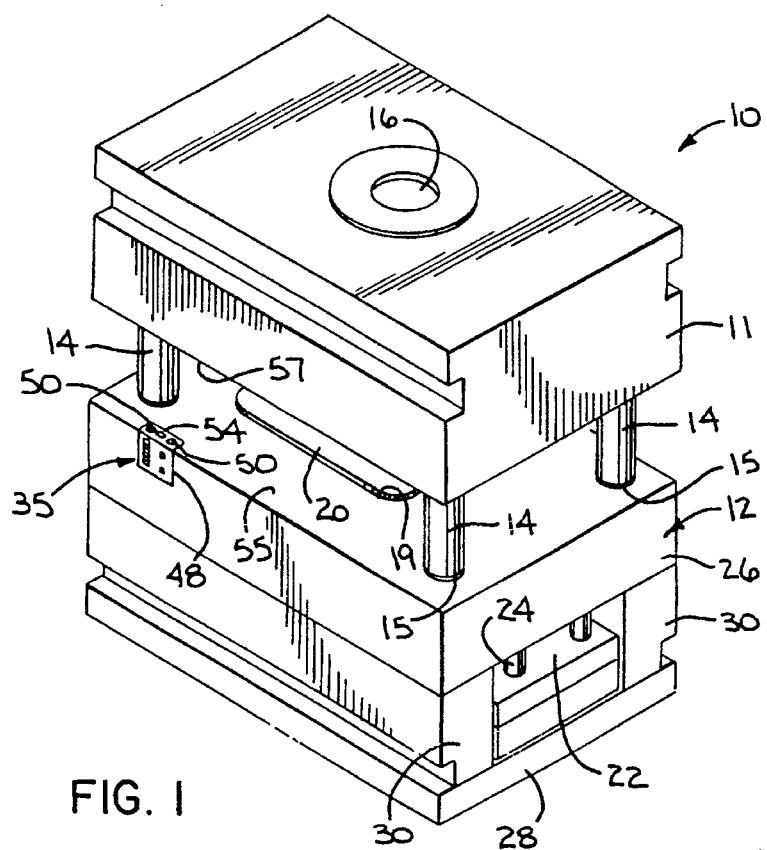
FIG. 1 is a partial, perspective view of a molding press having a mold with a monitor or counter positioned therein in accordance with the preferred embodiment of the invention.
Figure 2:
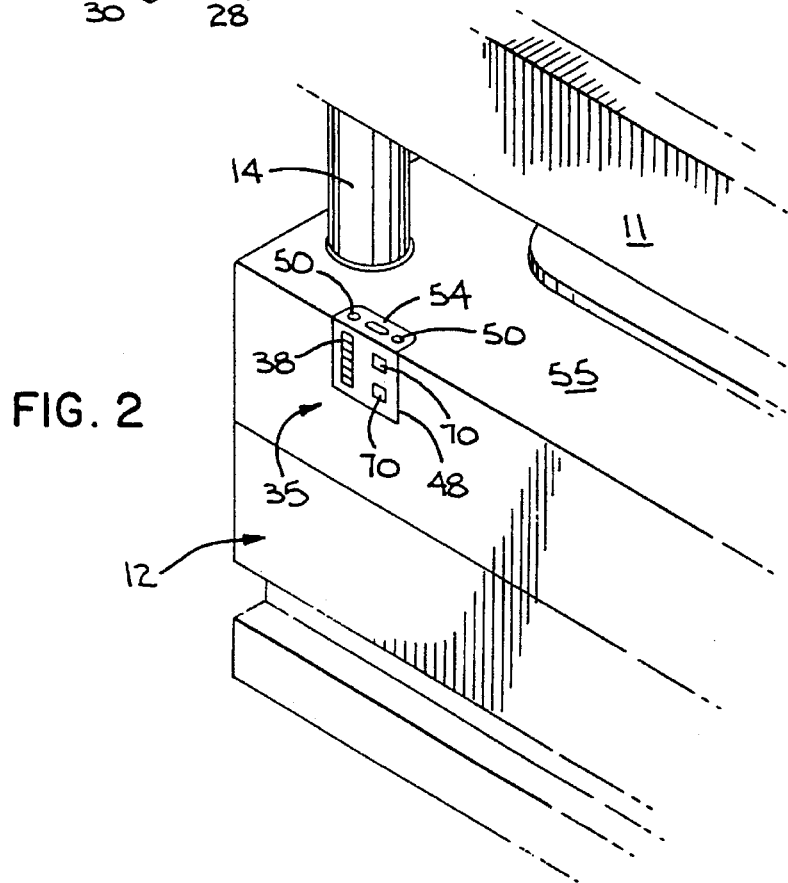
FIG. 2 is an enlarged view of the molding press for molding plastic parts and having a counter/monitor attached to the lower mold half.

As shown in the drawings for purposes for illustration, the invention is embodied in a mold 10, which includes an upper mold half 11 and a lower mold half 12. In this instance, the lower mold half 12 is shown in a lowered, open position and is mounted for vertical, reciprocal movement to an upper, closed position on four vertical posts 14 which are stationary or fixably mounted at their upper ends to the upper mold half 11. The lower mold half 12 has post-receiving bores 15 which slide along the respective posts 14 as the lower mold half is raised and lowered to complete a typical molding cycle by a molding press (not shown). The particular mold has an upper sprue or opening 16 through which the hot, molten plastic may be injected into a cavity in the upper mold half as well as a cavity 19 in the lower mold half which mates with the upper mold cavity to form the part 20. The part 20 is typically ejected by an upward movement of an ejector plate 22, which is mounted for vertical movement on four, vertical, small posts 24. The ejector plate 22 is mounted between the upper, horizontal mold block 26 and a lower, horizontal plate 28. A pair of side plates 30 connect the upper mold block 26 to the lower mold plate 28. Manifestly, the mold portions 11 and 12 may come in various sizes and shapes from that illustrated herein.

Figure 4:
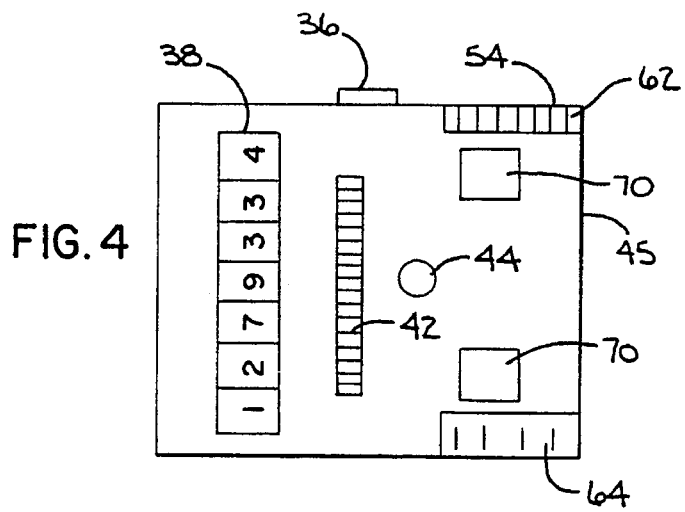
FIG. 4 is a side, elevational view of the counter/monitor.
Figure 5:
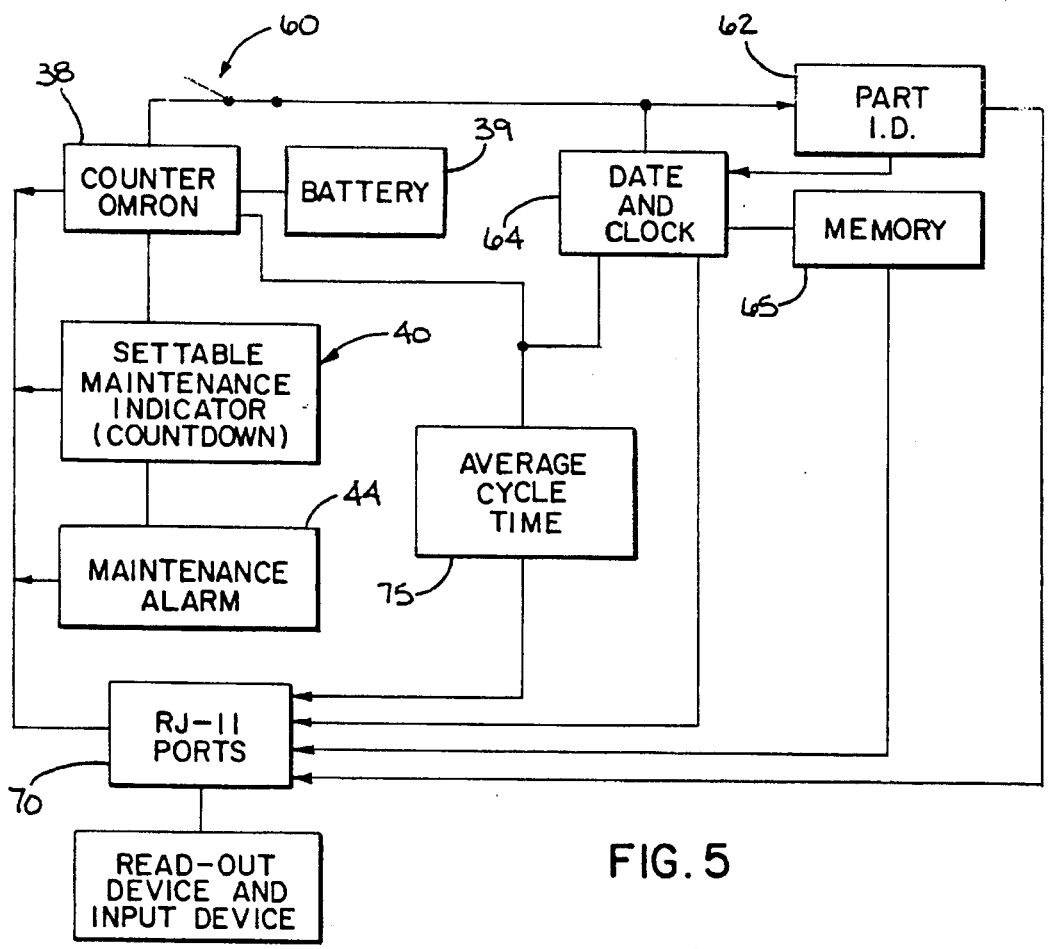
FIG. 5 is a block diagram of the monitor.

In accordance with the present invention, the mold 10 is provided with its own counter or monitor device 35, which includes an actuator 36 (FIG. 4) to be actuated with each opening and closing movement of the mold when it is in an injection molding press. Associated with the actuator 36 is an electrical cycle counter 38 which has a battery 39, as shown in FIG. 5, which maintains the cycle count in the counter for a prolonged period of time, whether the mold is in the press or out of the press. The preferred monitor also includes a maintenance means 40 which may include a series of setting switches 42 which can be set for a predetermined target or time when the maintenance is to be performed. When the count reaches the preferred count, the maintenance means 40 operates a maintenance alarm, which is in the form of a light 44 or audio alarm that is actuated to indicate that the particular mold needs maintenance.

Figure 3:
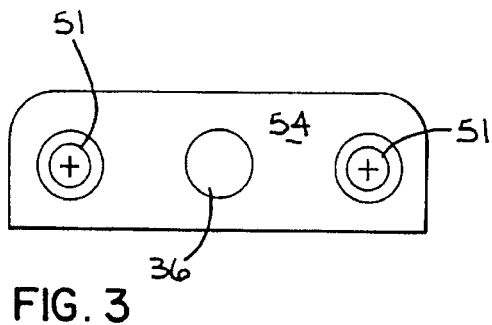
FIG. 3 is a top, plan view of the counter/monitor.

The preferred and illustrated monitor has a block-shaped body having an outer housing 45, which is a tough, closed body or housing for substantially enclosing and protecting the internal electronics and devices, which are shown in FIG. 5. The monitor may be mounted in various manners— that is, attached to the mold in various ways. When the monitor is built into the molds such as shown in FIG. 1, it is preferred to provide a pocket 48 in the mold block 26 with the body 45 being received in the pocket. A pair of mounting fasteners 50 extend through vertical openings or holes 51 (FIG. 3) in the housing 45 and threaded into the mold block 26.

Preferably, the upper top wall 54 of the monitor is substantially flush with the upper surface 55 (FIG. 1) of the mold block 26, with only the plunger actuator 36 projecting above the plane top surface 55 of the mold block 26. As the mold block is raised, the plunger actuator is lifted upwardly to abut the underside 57 of the top mold half 11, which is stationary in this instance, although it could be movable. The stationary, lower surface 57 then depresses the plunger actuator 36 to close a switch contact 60 (FIG. 5) to cause operation of the counter 38 for one cycle. Of course, when the mold opens and lowers the top surface 55 of the lower mold half from the undersurface of the top mold half, the plunger 36 is urged by an internal spring to again project above the top wall 54 of the monitor to be ready to be actuated upon the next closing cycle of the mold. Manifestly, the monitor could be positioned in the stationary, upper half of the mold to be actuated by the movable, lower half, or alternatively, both the upper and lower mold halves could be movable towards each other. In any event, there is always an entire opening and closing cycle for a mold for making a plastic part (or parts) which is then ejected by the ejector 22.

Referring now to FIG. 5, it is preferred that the monitor also have a number of other functions such as the part identification input device 62 by which a part identification number or name may be inputted into the monitor and stored therein so that each part being run on the mold may be specifically identified. Further, it is preferred that the monitor also have a settable date and time clock 64 (FIG. 5) by which the date is kept and the time of day is also kept. The date and clock device are particularly useful for retaining the history of operation of the mold in a memory 65. The memory 65 (shown in FIG. 5) keeps log of the dates when the mold is in usage and also may record in memory the number of cycles of the counter 38 to show how many parts have been made. Particularly where the mold is used for just-in-time production, there may be a series of dates stored in memory and a total count of the number of parts made over these days when the mold was actually in the press and molding parts. Whatever the particular arrangement, the date and clock may be used to provide in memory a history of the particular times of usage of the mold.

It is preferred that there be communication input and output parts here called, RJ11 ports 70, which can be connected to a readout device which preferably is a hand-held, readout device that is commercially available. Alternatively, the ports 70 could be connected to a computer which could interrogate the monitor for a complete readout of that which has been stored in memory. The readout device may also be an input device which can input information into the memory with respect to a particular preventive maintenance operation so that the mold has therein a particular history of what maintenance needs to be done so that the readout device can obtain a readout from memory of the preventive maintenance schedule from the memory 65.

In addition, it is preferred that the monitor, as shown in FIG. 5, have an average cycle time circuit or means 75 by which the cycle times are accumulated and then averaged; so that the average cycle time to make and eject a part can be displayed or read out, such as through the RJ11 ports 70. Alternatively, a separate indicator may be provided on the monitor face to show the average cycle time.

Preferably, the monitor not only includes the counter 38, which accumulates the total number of cycles which have occurred, but also includes the maintenance switch means 42 which can be set to a specific number, and when the counter 38 reaches this specific number set in the maintenance switch means 42, the latter actuates the alarm or indicator 44 to indicate to the press operator that the mold needs to receive preventive maintenance.

Figure 6:
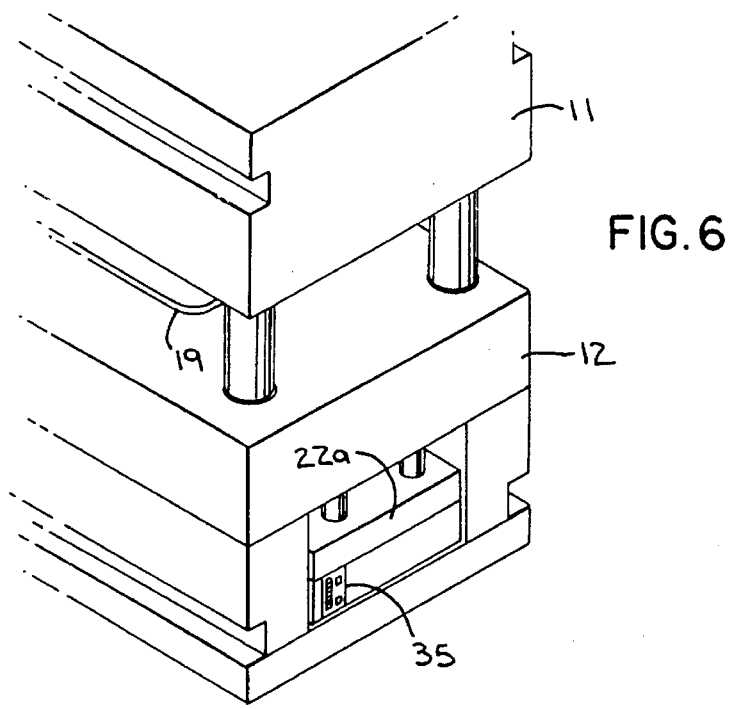
FIG. 6 is an alternative view showing the mold counter located in a position on the mold to be actuated with a part of the ejector or other means used with the mold.

In the embodiment shown in FIG. 6, the position of the mold monitor 35 has been changed to be located to a location beneath an ejector plate 22a. The actuator 36 of the monitor is operated by the ejector plate 22a as it moves between its lower position, when the mold is closed, and its upper position to eject the part.

By way of example only, a printout by the readout device from the monitor 35 on the mold may be, as follows:

| | |
|---|---|
| Part Name: | Bezel |
| Part I.D. #: | 5639-4 |
| Mold I.D. #: | 322 |
| Number of Mold Cavities: | 8 |

-continued

History:

12/4/93–3/4/94

| | |
|---|---|
| Number of cycles: | 345,604 |
| Average production cycle: | 10.0 seconds |

3/16/94–6/1/94

| | |
|---|---|
| Number of cycles: | 330,488 |
| Average production cycle: | 11.5 seconds |

Figure 8:
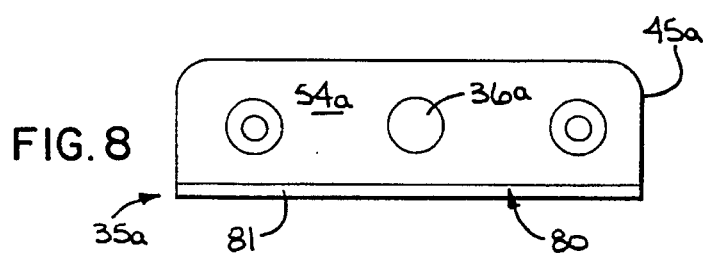
FIG. 8 is a plan view of the monitor illustrated in FIG. 7.
Figure 7:
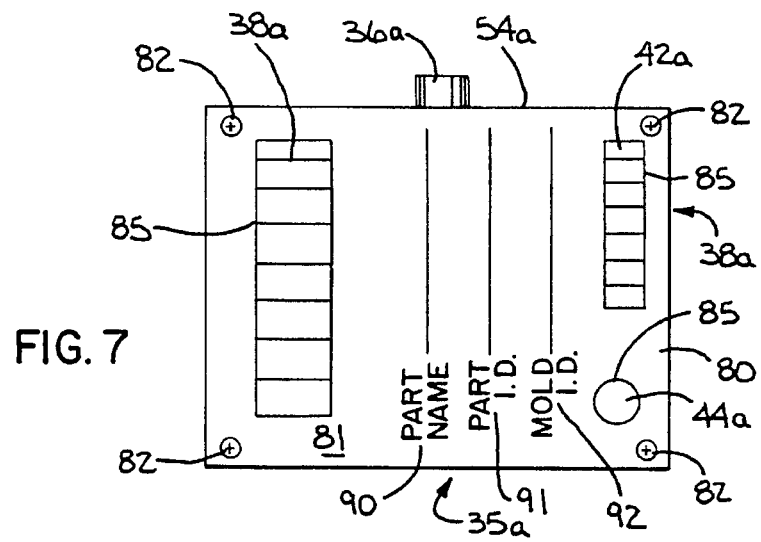
FIG. 7 is a side, elevational view of a monitor constructed in accordance with another embodiment of the invention.

In a further embodiment illustrated in FIGS. 7 and 8, the invention is embodied in a monitor 35a, which has an actuator 36a projecting upwardly above a top wall 54a of the housing 45a. The monitor 35a is more simplified and less expensive than the monitor 35 described in connection with FIG. 5, in that the monitor 35a lacks any electronic memory and any programmability. Instead, the monitor 35a has only an electric counter 38a, a settable, countdown maintenance device or switch 42a, and an indicator 44a operable by the maintenance switch device 42a when the counter has reached the count at which maintenance is to be performed.

The monitor 38 or 38a may be provided with an attachable identification tag 80 (FIGS. 7 and 8) which can be a plate 81 fastened by screws 82 threaded into threaded holes in the monitor housing 45a. The I.D. plate 81 may have three windows 85 or openings therein that expose the counter 38a, the maintenance countdown switch 42a, and the indicator light 44a. The I.D. plate 81 may be an inexpensive plate that has thereon the part name at 90, the part identification (I.D.) at 91, and the mold identification (I.D.) at 92. Because the identification tag 80 is removable, the monitor may be taken from one mold; and a new tag 80 for a new mold may be attached to the monitor by the screws 82; and the monitor is ready for use with the new mold. Manifestly, other forms of monitors or counters may be constructed from those illustrated herein and fall within the purview of this invention.

It may be undesirable to machine or provide a seat or pocket in existing molds to which is desired to attach a monitor. In such instances, the existing molds may have brackets or other devices attached thereto for mounting the monitor, i.e., to a sidewall of the mold, with the actuator projecting therefrom to be engaged and operated upon a relative movement between the mold portions between their opened and closed positions. Thus, the brackets or other devices with the extended actuator may allow the retrofitting of existing molds with such a monitor, without having to have a cavity to form therein or a specific space to accommodate the monitor, as below the ejector plate 22a, as shown in FIG. 6.

The term mold as used herein refers to mold bases or frames sold by mold manufacturers without the final cavity therein, as well as refers to molds that actually have the cavities therein. Thus, it is contemplated that a mold base or frame may be sold with a monitor or counter therein prior to actual cavity being formed.

From the foregoing, it is seen that there is provided a device which serves as a monitor and/or counter for an ejection mold which is relatively inexpensive and yet generates very accurate data, which shows the extent and usage of the mold for particular parts. Preferably, the monitor is more sophisticated than a simple counter and records therein mold identification information, part identification information, average cycle time information as well as actual dates and quantities of parts molded over particular times. The invention is particularly useful in that accurate information is retained about the usage of the mold and timely, proper maintenance can be more readily facilitated.

What is claimed is:

1. A mold having moving portions and constructed for removal from a molding press for storage and for return to the same or another molding press and for storing on the mold itself the number of molding cycles for maintenance purposes, the mold comprising:

a mold body;

a first mold portion of the mold having a first cavity therein;

a second mold portion of the mold having a second cavity therein aligned with the first cavity to mold a plastic part in the first and second cavities when the first and second mold portions are in a closed position;

guide means on the mold body for guiding the first and second mold portions between the closed position to mold the part and an open position with mold portions and cavities spaced apart, the movement of the first and second mold portions between open and closed positions constituting a molding cycle;

a monitor comprising a counter mounted in the first mold portion at a position spaced from the mold cavity so as not to be engaged by the plastic and at a position on the mold for viewing the mold cycles when the mold is stored or in use;

said counter being carried by the mold when the mold is removed from the molding press and retaining the last molding cycle count when the mold is removed from the molding press and when the mold is returned to the same or a different molding press; and a counter actuator operable by the moving portions of the mold moving through a molding cycle to continue the previous count when the mold and counter are returned from storage to the molding press.

2. A mold in accordance with claim 1 including maintenance switch means settable to indicate when the mold should receive maintenance.

3. A mold in accordance with claim 2 including an alarm means operable by the maintenance switch means to signal that it is time to do preventive maintenance.

4. A mold in accordance with claim 3 wherein the maintenance switch means is settable to a count down number, and the alarm means is actuated by the maintenance switch means when the count down number is attained.

5. A mold in accordance with claim 1 including a clock to record dates and time of usage of the mold.

6. A mold in accordance with claim 1 wherein means are provided for computing the average cycle time for molding a part.

7. A mold in accordance with claim 1 including a memory device for storing the identity of the part being mold.

8. A mold in accordance with claim 1 wherein ports are provided on the mold for connection to a readout device to obtain readouts of data from the counter.

9. A mold in accordance with claim 8 wherein means record the name of the part, a part identification and a mold identification which be read out from the port.

10. A mold in accordance with claim 1 including an identification means on the face of the monitor to identify the part and the mold.

11. A mold in accordance with claim 1 wherein an identification plate is attached to a face of the monitor to identify the part and the mold.

12. A mold in accordance with claim 1 wherein a pocket is formed in the first mold portion at a location spaced from the cavity; and an outer housing encloses the counter and is mounted in the pocket; and the housing comprising a tough, closed body for substantially enclosing and protecting internal portions of the counter.

13. A mold in accordance with claim 12 wherein an electrical battery is carried on the mold for the counter; and the counter is an electrical counter maintained by the electrical battery to store the last cycle count therein at the mold when it is removed from the molding press.

14. A mold in accordance with claim 13 wherein:

a recess is formed in an outer sidewall of the first mold portion; and a protective housing is mounted in the recess and a viewing window therein for exposing the cycle count at an exterior side of the mold.

* * * * *

UNITED STATES PATENT AND TRADEMARK OFFICE
CERTIFICATE OF CORRECTION

PATENT NO. : 5,571,539
DATED : November 5, 1996
INVENTOR(S) : Glenn Starkey

It is certified that error appears in the above-indentified patent and that said Letters Patent is hereby corrected as shown below:

Column 8, line 1, change "13" to --1--.

Signed and Sealed this

Eighteenth Day of March, 1997

Attest:

BRUCE LEHMAN

Attesting Officer     Commissioner of Patents and Trademarks